W. F. GATEWOOD.
FARM GATE.
APPLICATION FILED AUG. 8, 1913.
1,102,578.
Patented July 7, 1914.
2 SHEETS—SHEET 1.
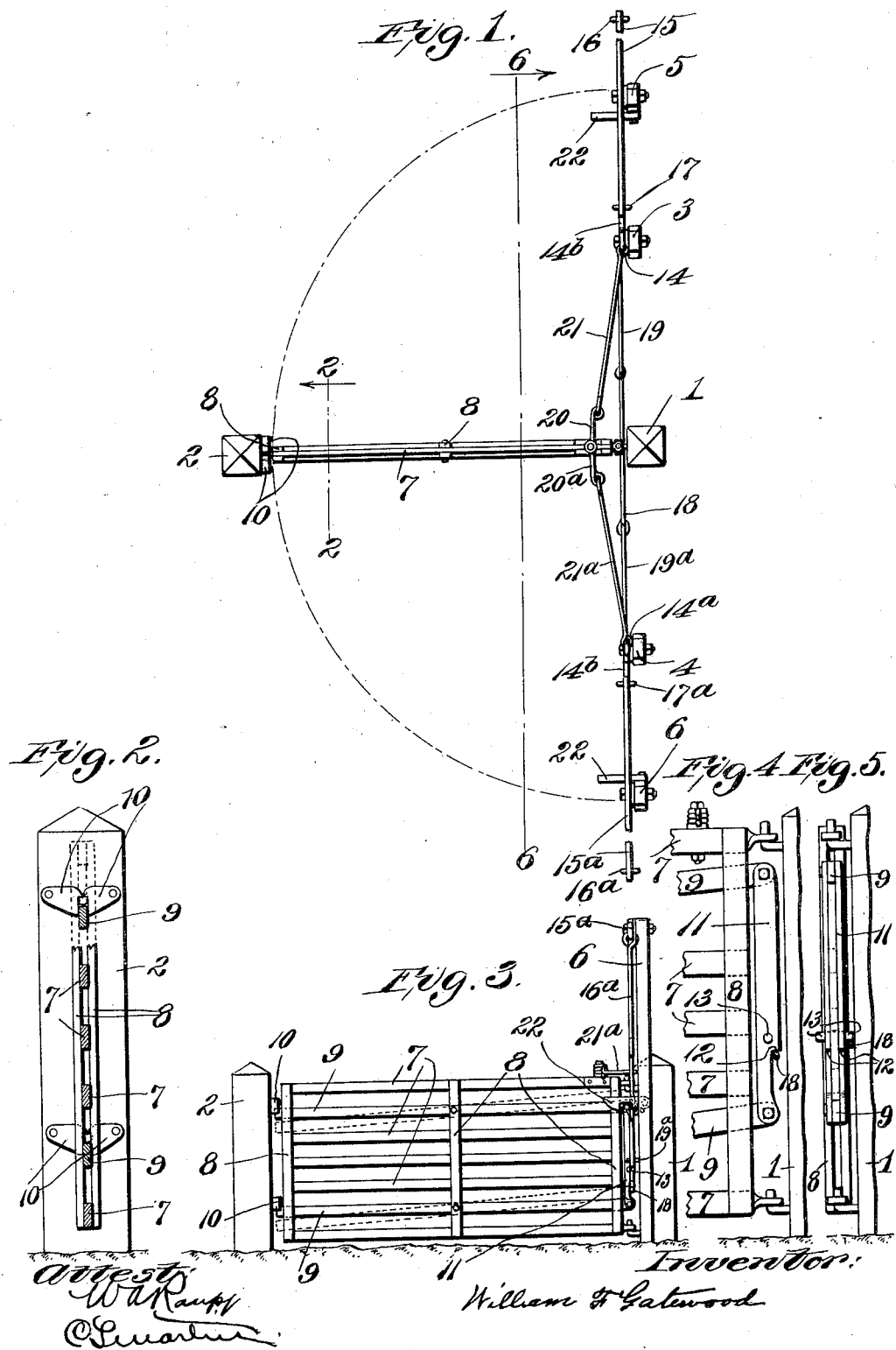
Inventor:
William F. Gatewood

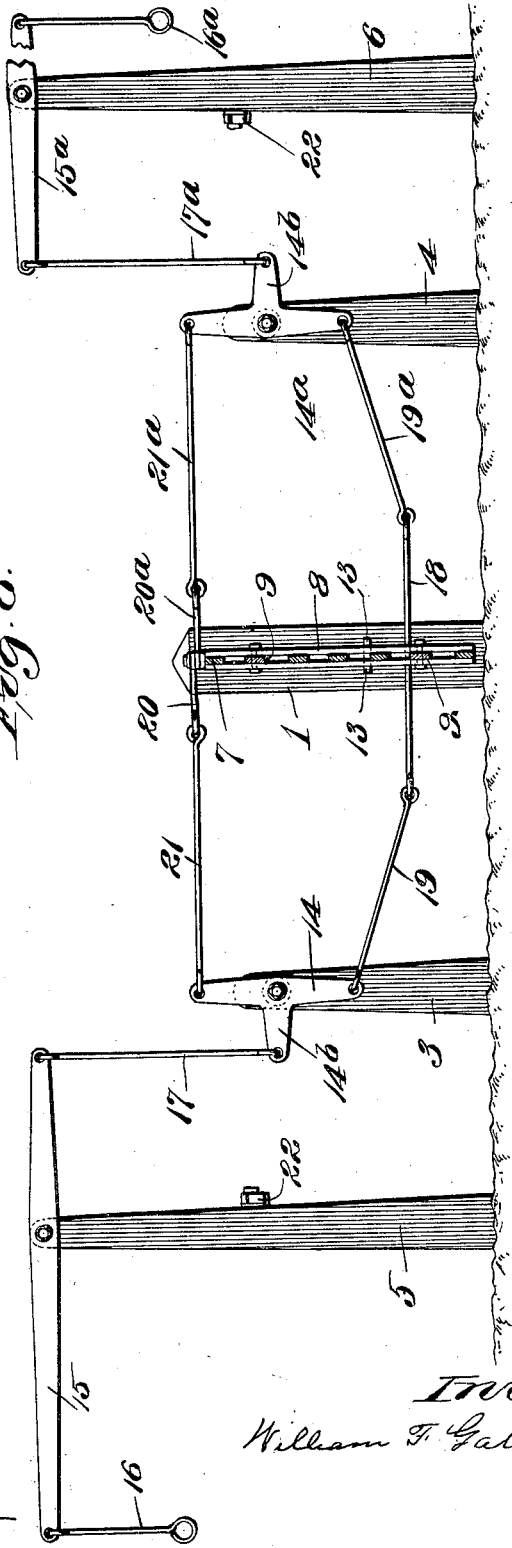

UNITED STATES PATENT OFFICE.

WILLIAM F. GATEWOOD, OF PIERCE CITY, MISSOURI.

FARM-GATE.

1,102,578. Specification of Letters Patent. Patented July 7, 1914.

Application filed August 8, 1913. Serial No. 783,672.

*To all whom it may concern:*

Be it known that I, WILLIAM F. GATE-WOOD, a citizen of the United States, and resident of Pierce City, Lawrence county, Missouri, have invented certain new and useful Improvements in Farm-Gates, of which the following is a full, clear, and exact description, reference being had to the accompanying drawings.

My invention relates to a new and improved farm gate, the principal object of my invention being to construct a comparatively simple, inexpensive gate adapted for use on farms or public highways, and which gate is provided with simple mechanism whereby it may be opened by a person approaching said gate from one side and closed from the opposite side.

To the above purposes my invention consists in certain features of novelty hereinafter more fully described, claimed and shown in the accompanying drawings, in which:

Figure 1 is a top plan view of a gate of my improved construction. Fig. 2 is an enlarged vertical sectional view taken on the line 2—2 of Fig. 1. Fig. 3 is a side elevational view of the gate. Fig. 4 is an enlarged elevational view of the rear end of the gate and showing parts thereof, elevated. Fig. 5 is an end view of the rear end of the gate in the position the same assumes when swung into open position. Fig. 6 is an enlarged section taken on the line 6—6 of Fig. 1 and looking in the direction indicated by the arrow on said line.

Referring by numerals to the accompanying drawings, 1 designates the post to which the gate is hinged and 2 the post against which the free end of the gate swings. Located at short distances away from the post 1 and on opposite sides thereof, are short posts 3 and 4, and located at short distances beyond these posts are posts 5 and 6 to which the gate operating levers are fulcrumed.

The gate proper comprises a series of horizontally disposed rail 7, and a series of vertically disposed rails 8. The upper and lower ones of the rails 7 are hinged in a suitable manner to the post 1. A pair of horizontally disposed rails 9 are pivotally mounted on the central one of the vertically disposed rails 8 and the ends of this pair of rails 9 project beyond the rails 8 at the ends of the gate. The projecting ends of these rails 9 at the free end of the gate are adapted to engage between pairs of gravity latches 10, which are pivotally mounted on the post 2. The projecting ends of these rails 9 at the rear end of the gate are pivotally connected to the ends of a pair of vertically disposed bars 11, the lower portions of which are provided with notches or shoulders 12, and projecting outwardly from said bars immediately above these notches are short pins 13.

Fulcrumed on the upper portions of the posts 3 and 4 are vertically disposed levers 14 and $14^a$, each being provided with a centrally arranged horizontally disposed arm $14^b$. Fulcrumed to the upper ends of the posts 5 and 6 are operating levers 15 and $15^a$, and depending from the outer ends thereof are pull rods 16 and $16^a$. A rod 17 connects the inner end of lever 15 with the arm $14^b$, and a corresponding rod $17^a$ connects the inner end of lever $15^a$ with the arm $14^b$. Positioned behind the bars 11 and adapted to bear against the notches 12 therein is a horizontally disposed rod 18, the ends of which are loosely connected to short rods 19 and $19^a$. The outer end of rod 19 is connected to the lower end of lever 14, and the outer end of rod $19^a$ is connected to the lower end of lever $14^a$.

Pivotally connected to the top one of the rails 7 near the rear end of the gate is a pair of links 20 and $20^a$, and loosely connected to the link 20 is a rod 21, the outer end of which is connected to the upper end of lever 14. A corresponding rod $21^a$ is loosely connected to link $20^a$, and at its outer end to the upper end of lever $14^a$. Fixed to and projecting outwardly from the posts 5 and 6 are hooks 22 which are adapted to engage the upper one of the pivoted bars 9 when the gate is swung open to its limit of movement.

Under normal conditions and while the gate is in position to close the passage way between the posts 1 and 2, the various parts of the gate and operating mechanism occupy the positions seen in Figs. 1, 3 and 6. Assuming that a person desires to open the gate from the side on which the post 5 is located, the pull rod 16 is manually engaged and pulled downward thereby swinging the lever 15 on its fulcrum and elevating the rod 17. This action swings the lever 14 on its fulcrum, thereby pulling the rod 19 outward and at the same time pulling the rod 18 upward and outward. As the rod 18 is pulled upward it engages the shoulder at the upper ends of the notches 12, thereby elevating the bars 11 and likewise elevating the rear ends of the rails 9. These rails swing upon their pivot points thereby moving their lower ends downward, as shown by dotted lines in Fig. 3, consequently freeing their outer ends from the latches 10 and the gate is now free to swing open toward the posts 4 and 6. As the rod 18 is drawn lengthwise by the rod 19, as previously described, the rod 19$^a$ is drawn lengthwise, consequently swinging the lever 14$^a$ on its fulcrum, which movement pulls the rod 21$^a$ outward away from the gate and toward the post 6, and this pulling movement of said last mentioned rod is imparted through the link 20$^a$ to the gate and the latter is swung into open position against the posts 4 and 6. As said gate swings against post 6 the hook 22 on said post engages the upper one of the rails 9 thereby holding the gate in open position. The operator now passes through the gateway between the posts 1 and 2 and desiring to close the gate, manually engages the pull rod 16$^a$ and pulls downward upon the same. This action swings the lever 15$^a$ upon its fulcrum, elevates rod 17$^a$, swings lever 14$^a$ upon its fulcrum, and pulls rod 19$^a$ toward the post 4. This movement imparts lengthwise and upward movement to the rod 18, and as the same moves upward it engages against one of the pins 13 thereby elevating the bars 11 and swinging the rails 9 upon their fulcrums. As this movement takes place, the upper one of said rails is free from the hook on the post 6, thereby permitting the gate to swing backward to normal position between the posts 1 and 2. As the rod 18 is pulled lengthwise, rod 19 is likewise pulled thereby actuating lever 14, consequently pulling rod 21 toward post 3, and this pulling movement is imparted to the gate through link 20.

A gate of my improved construction is comparatively simple, can be erected with comparatively little expense, is positive in action, and can be manipulated with little effort on the part of the operator.

It will be readily understood that minor changes in the size, form and construction of the various parts of my improved gate can be made and substituted for those herein shown and described without departing from the spirit of my invention, the scope of which is set forth in the appended claims.

I claim:

1. The combination with a pair of posts, of a gate hinged to one of said posts, a pair of rails fulcrumed on said gate, the ends of which rails project beyond the ends of the gate, latches on the post against which the free end of the gate swings, which latches are adapted to engage the projecting ends of the rails at the free end of the gate, a vertically disposed bar connecting the projecting ends of the rails at the rear end of the gate, which bar is provided with a notch, a rod adapted to engage against the shoulder at the end of the notch in said bar, and gate operating means connected to the ends of said rod, parts of which operating means are connected to the rear portion of the gate for actuating the same at the same time the bar engaging rod is actuated.

2. The combination with a pair of posts, of a gate hinged to one of said posts, a pair of rails fulcrumed on said gate, the ends of which rails project beyond the ends of the gate, latches on the post against which the free end of the gate swings, which latches are adapted to engage the projecting ends of the rails at the free end of the gate, a vertically disposed bar connecting the projecting ends of the rails at the rear end of the gate, which bar is provided with a notch, a rod adapted to engage the shoulder at the end of the notch in said bar, posts located on opposite sides of the post to which the gate is hinged, levers fulcrumed on said last mentioned posts, and connections between said levers and the bar engaging rod and the gate.

3. The combination with a pair of posts, of a gate hinged to one of said posts, a pair of rails fulcrumed on said gate, the ends of which rails project beyond the ends of the gate, latches on the post against which the free end of the gate swings, which latches are adapted to engage the projecting ends of the rails at the free end of the gate, a vertically disposed bar connecting the projecting ends of the rails at the rear end of the gate, which bar is provided with a notch, a rod adapted to engage the shoulder at the end of the notch in said bar, posts located on opposite sides of the post to which the gate is hinged, levers fulcrumed on said last mentioned posts, and means connected to the gate and to the bar engaging rod and actuated by said fulcrumed levers for simultaneously actuating the bar and moving the gate.

4. The combination with a post, of a gate hinged thereto, rails fulcrumed on said gate, means for engaging said rails to hold the gate in closed and open position, a bar connected to the rear ends of said rails, a rod positioned behind said bar, means on said bar which is adapted to be engaged by the rod when the same is moved, and gate operating means arranged on opposite sides of the gate, portions of which operating means are connected to the rod and other portions being connected to the gate.

5. The combination with a post, of a gate hinged thereto, a pair of rails fulcrumed on the gate, the rear ends of which rails project beyond the rear end of the gate, means for engaging the fulcrumed rails near the free end of the gate for holding the same in closed and open position, a bar connecting the projecting rear ends of the rails, which bar is provided with a notch, a pair of pins projecting from opposite sides of said bar, a rod passing behind said bar, which rod is adapted to engage against the shoulder at the end of the notch and against either one of the pins carried by said bar, and gate operating means arranged on opposite sides of the gate, a portion of which operating means is connected to the rod and a portion being connected to the gate.

In testimony whereof I hereunto affix my signature in the presence of two witnesses, this 25th day of July, 1913.

WILLIAM F. GATEWOOD.

Witnesses:
W. A. RAUPP,
C. L. MARTIN.

Copies of this patent may be obtained for five cents each, by addressing the "Commissioner of Patents, Washington, D. C."